Figure 1:
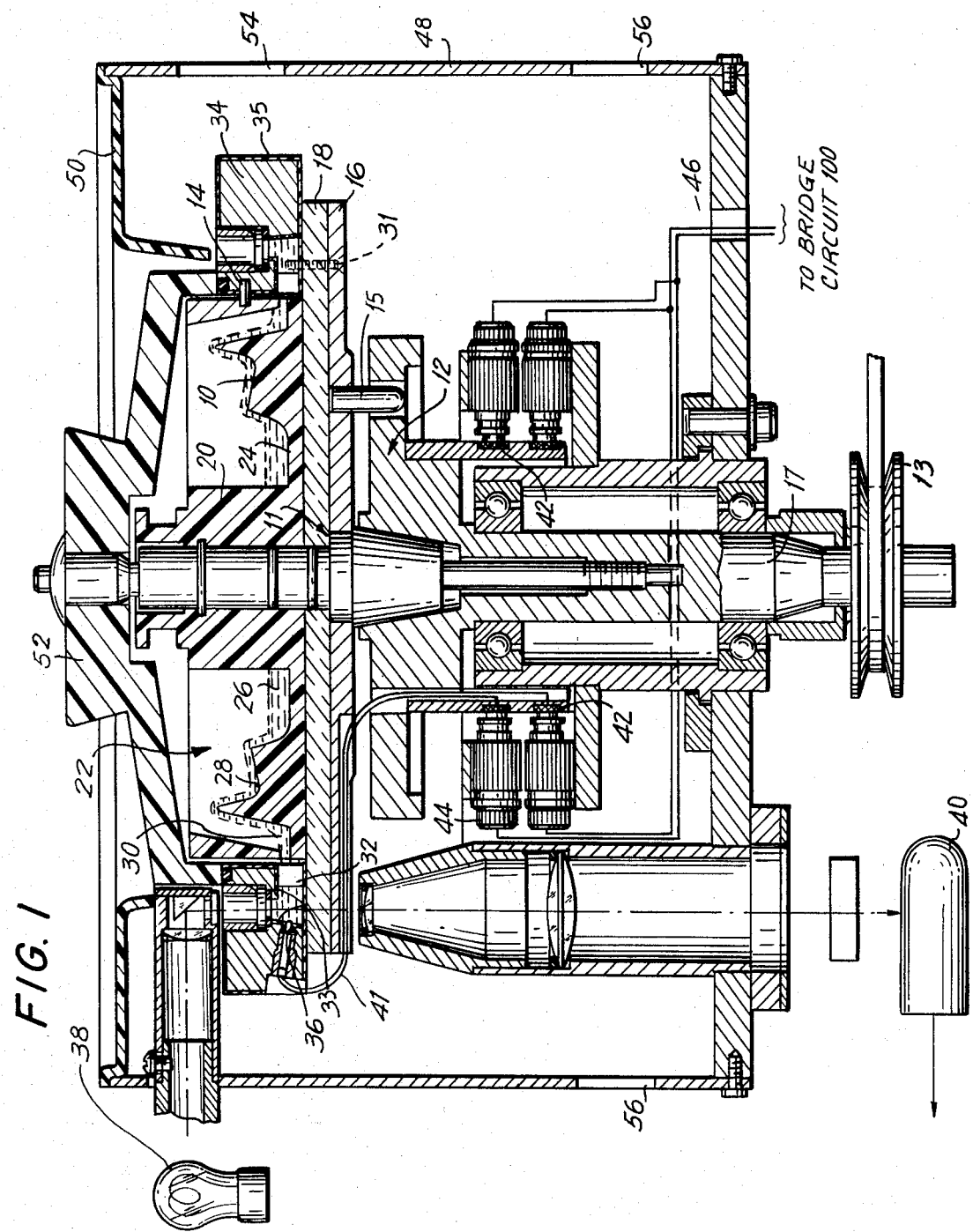

United States Patent [19]
Hinman

[11] 3,863,049
[45] Jan. 28, 1975

[54] TEMPERATURE CONTROL APPARATUS FOR A CENTRIFUGAL-TYPE CHEMISTRY ANALYZER

[75] Inventor: Clyde D. Hinman, Wilton, Conn.

[73] Assignee: Union Carbide Corporation, New York, N.Y.

[22] Filed: May 31, 1972

[21] Appl. No.: 258,259

[52] U.S. Cl. ............... 219/389, 165/39, 219/370, 219/441, 219/494, 233/11
[51] Int. Cl. .................. F27b 7/00, F27d 11/02
[58] Field of Search .......... 219/370, 385, 388, 389, 219/400, 413, 430, 441, 494; 34/8, 58, 59; 165/39; 233/11

[56] References Cited
UNITED STATES PATENTS

| | | | |
|---|---|---|---|
| 2,742,190 | 6/1973 | Giani | 219/389 |
| 2,768,546 | 10/1973 | Shipes | 165/39 |
| 3,246,688 | 4/1966 | Colburn | 165/39 |
| 3,322,338 | 5/1967 | Stallman et al. | 233/23 |
| 3,529,358 | 9/1970 | Robinson | 219/400 X |
| 3,566,070 | 2/1971 | Pesgat | 219/388 X |

Primary Examiner—Volodymyr Y. Mayewsky
Attorney, Agent, or Firm—Frederick J. McCarthy

[57] ABSTRACT

A temperature control apparatus for raising and controlling the temperature of small volumes of liquid by heating the liquid and detecting the instantaneous temperature and rate of temperature increase and utilizing this information to control the heating of the liquid so that the desired liquid temperature is attained and maintained in a minimum time interval.

4 Claims, 5 Drawing Figures

TEMPERATURE CONTROL APPARATUS FOR A CENTRIFUGAL-TYPE CHEMISTRY ANALYZER

The present invention is directed to an improved temperature control system. More particularly, the present invention is directed to a temperature control system for controlling the temperature of small volumes of liquid undergoing analysis in a centrifugal-type chemistry analyzer.

Centrifugal-type chemistry analyzers, such as the type disclosed in "Analytical Biochemistry", 28 545–562 (1969) introduce by centrifugal force small volumes of liquid sample and reagent, e.g., a combined volume of 300–600 milliliters into a series of cuvettes arranged around the periphery of a rotor. The reaction in the cuvettes is monitored with precision by photometric means. The reactions involved are usually temperature sensitive, with a constant temperature in the range of 25° to 40°C being usually required. Since the liquids involved in the tests are rarely at the desired temperature to begin with, and often are under refrigeration until just prior to testing, it is important that a system be provided for raising and controlling the temperature of the liquids involved. Also, since most of the reactions involved in the use of centrifugal analyzers proceed rapidly, it is important that the temperature of the test liquid be brought rapidly, e.g., within about 30 to 40 seconds, to the desired value and held closely at this value throughout the testing period.

It is therefore an object of the present invention to provide a system for raising and accurately controlling the temperature of small volumes of test liquids in a centrifugal-type chemistry analyzer.

Figure 2:
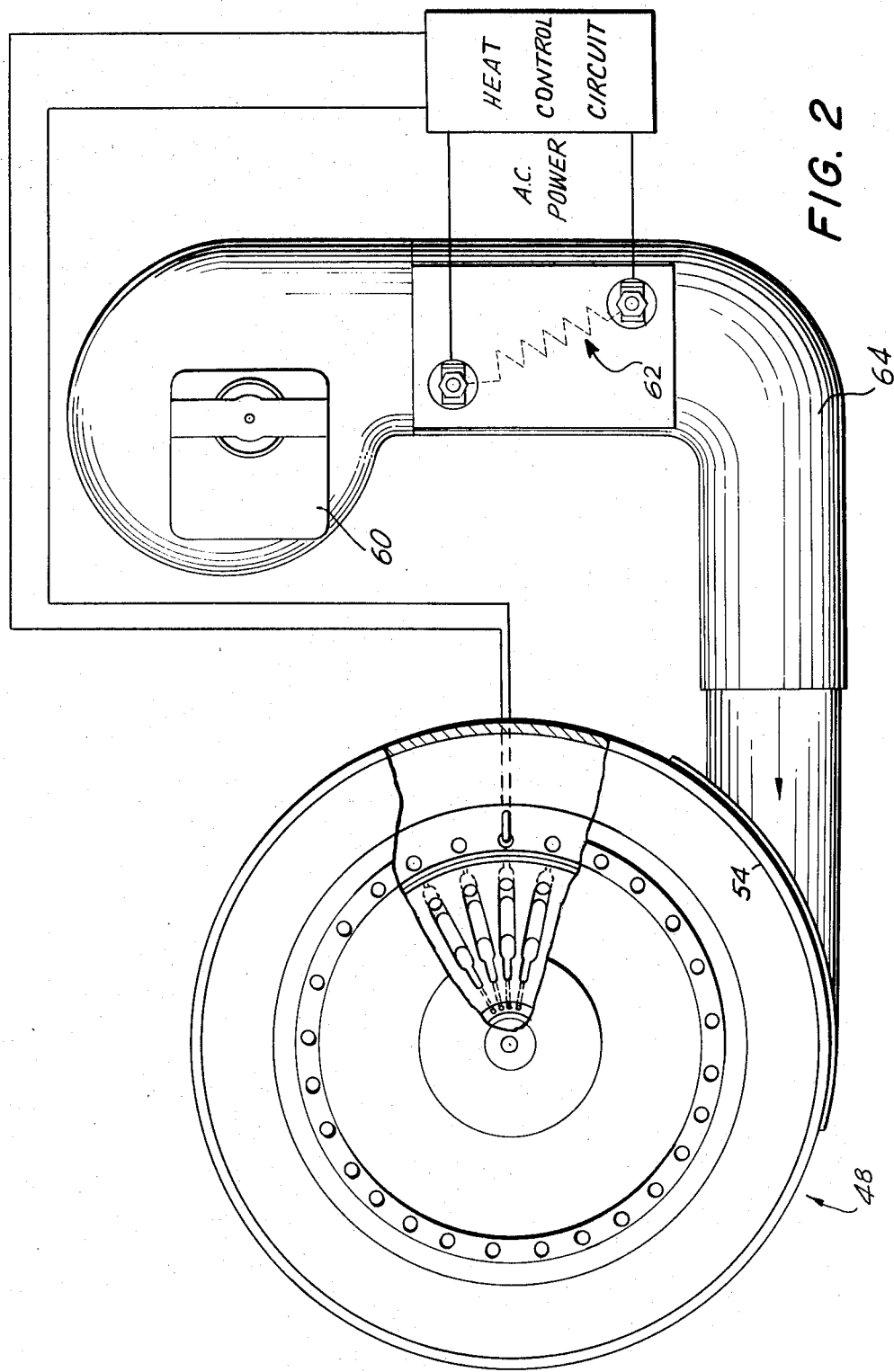
Figure 3:
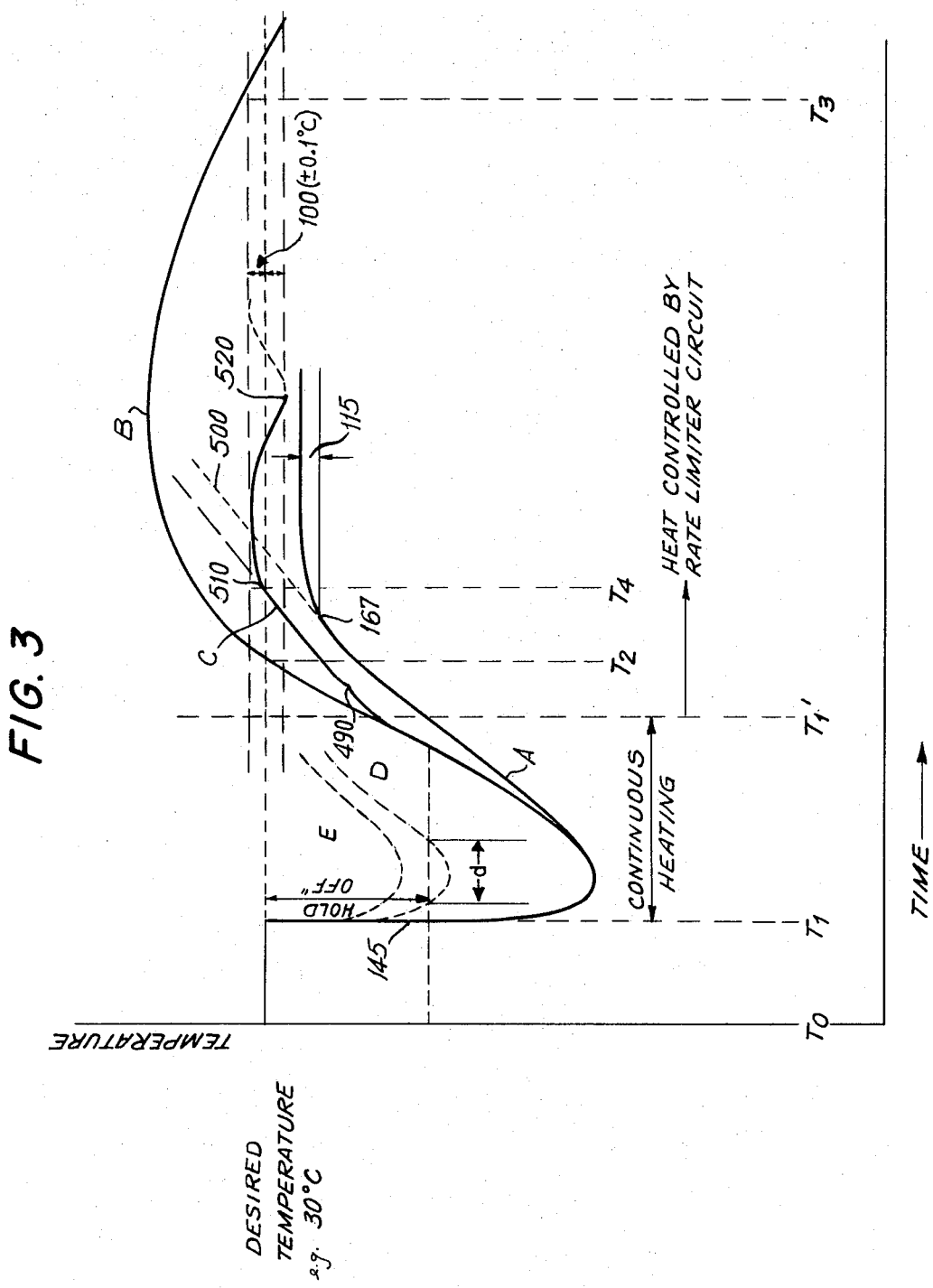
Figure 4:
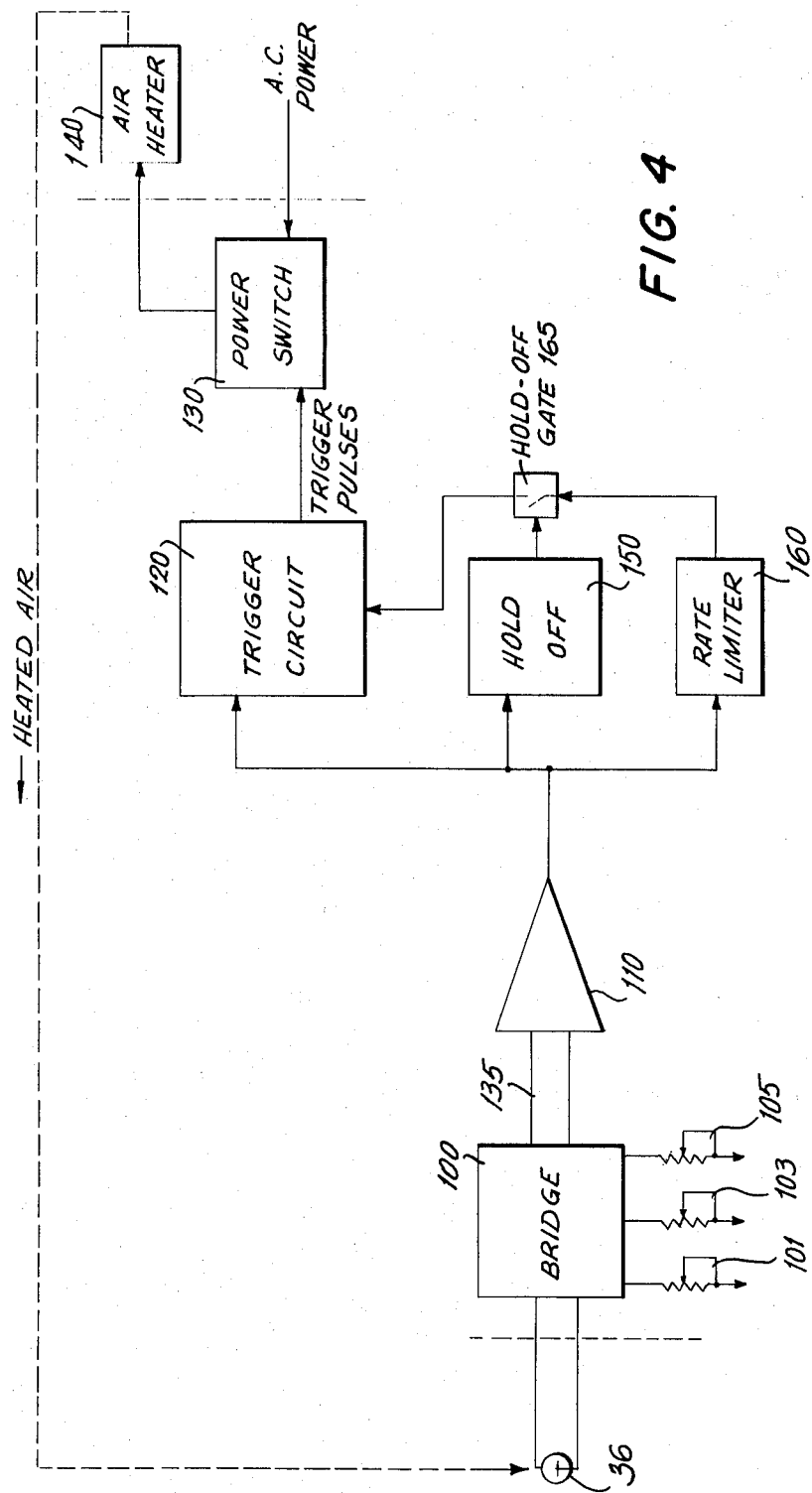
Figure 5:
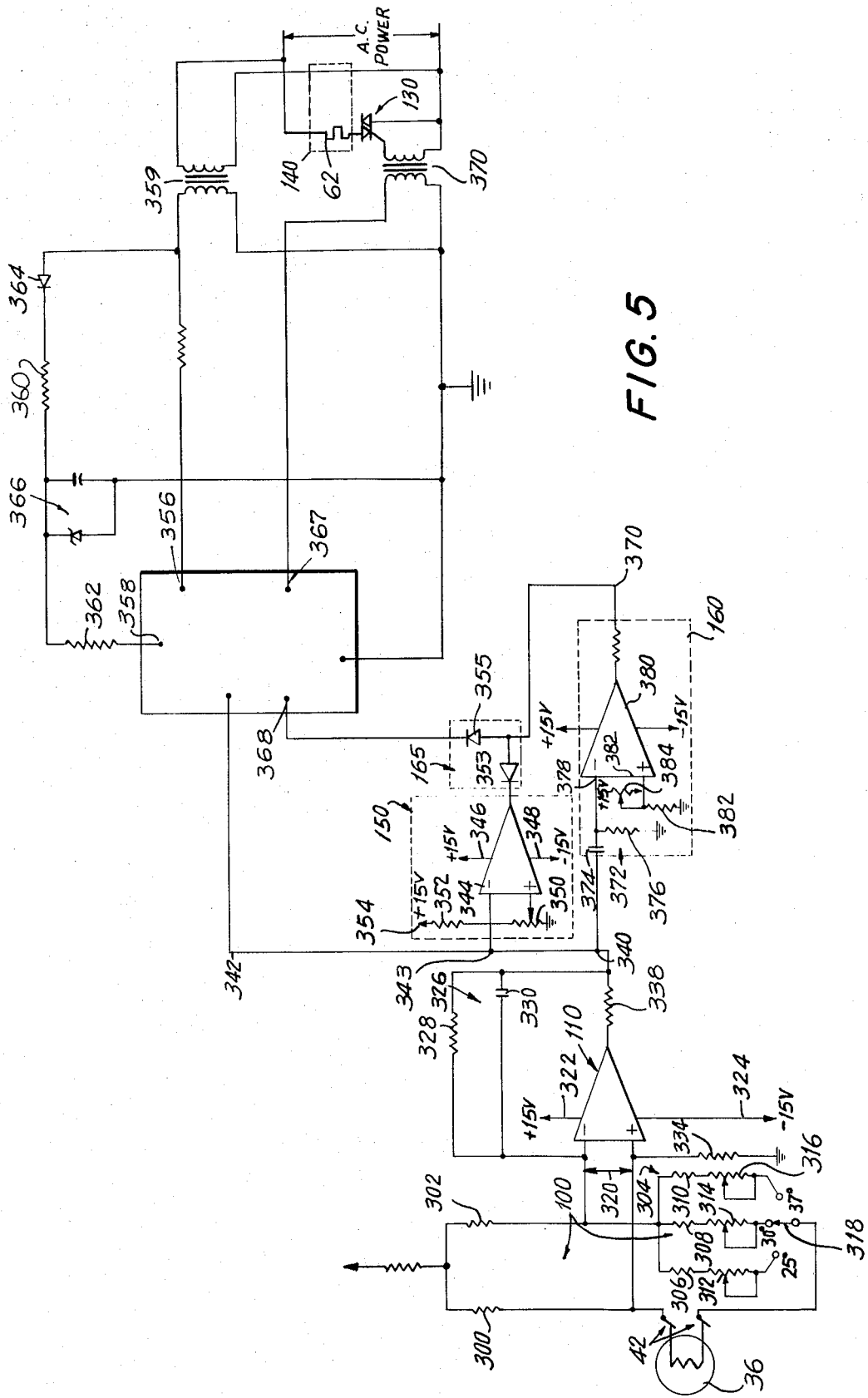

Other objects will be apparent from the following description and claims taken in conjunction with the drawing wherein:

FIG. 1 is a sectional elevation veiw of a centrifugal type analyzer,

FIG. 2 is a plan view of the analyzer of FIG. 1 showing means for applying heated air to the analyzer, FIG. 3 shows a series of curves representing various heating conditions in an analyzer of the type illustrated in FIG. 1, FIG. 4 shows a block diagram of the temperature control system of the present invention and, FIG. 5 shows a specific embodiment of a temperature control system in accordance with the present invention. With reference to the drawing FIG. 1 shows in elevation a centrifugal-type analyzer comprising a removable sample-reagent disc 10 supported on a rotor 11 and indexed thereto by pin 14. Rotor 11 is affixed to drive assembly 12 by pin 15. Drive assembly 12 is rotatably driven by way of v-belt pulley 13 attached to drive shaft 17. The portion 16 of rotor 11 is suitably of stainless stell over which is arranged a glass plate 18. The body portion 20 of sample-reagent disc 10 is suitably formed of Teflon* and contains a plurality, usually about 30, of concentrically arranged inter-connecting cavities indicated at 22. Reagent cavity 24, contains for example a glucose reagent such as a 0.3 molar triethanolamine buffer of pH 7.5 containing 0.0004 Mol/liter NADP, 0.0005 Mol/liter ATP, 70 mg/liter hexokinase, 140 mg/liter glucose-6-phosphate dehydrogenase and 0.004 Mol/liter MgSO$_4$. The reagent, indicated at 26, upon spinning of the sample-reagent disc 10, passes into sample cavity 28, containing for example blood serum, and both liquids pass via transfer passage 30 into cuvette 32 located in ring member 34 which is affixed at 31 to rotor 11. Cuvette 32, and all other cuvettes, are enclosed by ring member 34 and are in that transfer relation therewith. Ring member 34 is formed of aluminum, coated for corrosion resistance purposes with a thin layer of Teflon* 35 in which is mounted a temperature sensing element, e.g., a thermistor, indicated at 36 which is adapted to provide an electrical signal indication of the temperature of the liquid in cuvette 32. Cuvettes 32 are also provided with a thin Teflon* coating 33 for purposes of corrosion resistance. The extent of the reaction between the liquids in cuvette 32 is measured photometrically by means of light source 38 and photomultiplier 40. The electrical signal derived from thermistor 36 is conducted via wire leads 40 to slip rings 41 and to brushes 44 from which the signal is conducted by wires 46 to the temperature controlling circuit illustrated in FIGS. 4 and 5 hereinafter more fully described.

*Trademark of E.I. duPont de Nemours

As shown in FIG. 1, the reaction in the cuvettes will take place within a substantially confined space enclosed by metal housing 48, plastic ring shield member 50 and plastic cap member 52. This arrangement essentially separates the interior of the housing from the outside ambient temperature conditions. Hot air, controlled by the circuit of FIGS. 4 and 5 is introduced into the confined reaction environment at opening 54 and exits through openings 56 in housing 48. The general heating arrangement is illustrated in FIG. 2 which shows schematically a conventional blower motor and blower unit 60 which forces air over heating element 62 through duct 64 and into housing 48.

With reference to FIG. 3 of the drawing, this Figure shows a series of curves, obtainable using a conventional "Brush" millivolt recorder which relate to the raising of the temperature of a liquid in a cuvette 32 to a desired temperature. Curve A represents the characteristic variation of temperature with time in the cuvette upon introduction of cold liquid into the cuvette without any heat being added. This characteristic variation is obtained in the practice of the present invention due to the fact that the cuvette is located in a member, i.e., aluminum ring member 34, which has a substantially larger thermal mass than the liquid in the cuvette and is at the desired reaction temperature. Ring member 34 can be quickly raised to the desired reaction temperature simply by actuating the control circuit without any liquid in the cuvettes. The heat stored in the ring member is conducted to the liquid in the cuvettes causing the cuvette temperature to rise as generally indicated by curve A. The temperature control system of the present invention is most effective, if the temperature of the liquid in the cuvettes be raised, without the direct application of heat, from an initial "cold" condition in the range of about 15°C to 20°C, to within 0.4° to 0.8°C of the desired value in the range of about 25°C to 40°C, within 20 to 40 seconds. This can be readily provided through the use of a metal ring member 34 having a thermal mass of about 5 to 20 times or more of the thermal mass of the total liquid in the cuvettes. Aluminum is preferred for the ring member 34 because of its high heat conductivity although generally all structural metals and high heat conducting materials can be used. By way of example, the thermal mass of a 1 kilogram aluminum ring member would be 1,000 × 0.23 (the specific heat of aluminum) or about 230. The thermal mass of 12 grams of reagent plus sample (95 percent or more water) would be 12 × 1 (the specific heat of water) or about 12. The ratio of the thermal mass of the ring to the liquid would be about 20. A ring member of about 2,500 grams of copper would provide about the same ratio. Care should be taken in coating the cuvette with any substance that introduces significant thermal resistance between the liquid in the cuvette and the ring member so that the desired temperature increase is not unduly delayed. For example, a 3–7 mil Teflon* coating has been found to be satisfactory where a ring to liquid thermal mass ratio of about 20 is provided. Referring further to FIG. 3, at time $T_1$ the temperature in the empty cuvette is the desired value, e.g., 30°C. The temperature in the cuvette is initially at the desired value, e.g., 30°C, due to prior heating of ring member 34 with hot air from the heater unit illustrated in FIG. 2. When cold liquid fills the cuvette the temperature drops rapidly and then, on account of the heat stored in the relatively larger rotor mass, and the small liquid volume in the cuvette, the temperature fairly rapidly rises. However the temperature in the cuvette will never get within a tolerable value of the desired temperature, e.g., ±0.1°C, indicated at 100 without the addition of heat.

*Trademark of E.I. duPont de Nemours

If excess heat is rapidly and continuously applied to the enclosed cuvette system from time $T_1$ to $T_2$, the temperature-time relationship will be generally as indicated in curve B, i.e., the desired temperature will be reached rapidly and then exceeded by an undesirably large amount and will "over shoot" requiring a relatively long time to return to within an acceptable tolerance of the desired value as indicated at $T_3$. If, on the other hand, insufficient heat is applied, the situation approaches the condition of curve A.

The desirable situation is illustrated by curve C when the temperature rapidly reaches the desired value and where any "over shoot" is within the acceptable tolerance, e.g., about 0.1°C.

This is accomplished in the present invention by the arrangement illustrated in FIGS. 4 and 5. With reference to FIG. 4, the output voltage signal from the cuvette thermistor 36 is applied to a standard bridge circuit 100 having adjustments 101, 103 and 105 whereby the bridge circuit 100 will indicate a "zero" value when the signal from thermistor 36 corresponds to the preset desired temperature, e.g., 30°C. In the case where a cold sample is introduced into the cuvette, the signal from thermistor 36 will cause the bridge 100 to be unbalanced and a signal proportional to the temperature difference, indicated at 135, will be applied to amplifier 110 to actuate trigger unit 120. Pulses from the trigger unit 120 are applied to a power switch 130 which permits alternating current power to be applied to how air heater 140 so long as pulses are received from trigger unit 120. The hot air from heater 140 is directed to the cuvette rotor assembly as previously described to raise the temperature in the cuvette. When the "no added heat" profile (curve A) of the unit is approximately known as shown in FIG. 3, an initial "hold off" temperature can be estimated. This "hold off" temperature can be initially selected as about one half the total temperature drop, indicated at 145 in FIG. 3. This "hold off" may be on the order of 2°C. With the approximate "hold off" value determined, "hold off" circuit 150 is set so that the output of rate limiter circuit 160 is isolated from the trigger circuit 120 by gate 165 for as long as the temperature in the cuvette is below the set "hold off" temperature. Under these circumstances, the signal from bridge 100 is applied via amplifier 110 to trigger circuit 120 and heater 140 supplies heat to the cuvette containing ring member 34. When the temperature in the cuvette raises to the "hold off" level, the output of rate limiter circuit 160 will be applied to trigger circuit 120 by the closing of "hold off" gate 165. Rate limiter circuit 160 detects the increase in rate of the output of amplifier 110, i.e., the rate of temperature increase in the cuvette. If the rate of temperature increase is too fast, as compared to a predetermined value, i.e., an "over shoot" will eventually occur unless heating is discontinued, and under these conditions, a signal from the rate limiter circuit 160 "turns off" the trigger circuit 120. Heat is no longer applied to the rotor assembly until the rate of temperature increase falls below the desired predetermined value, at which time the signal of rate limter 160 is no longer applied to trigger circuit 120 and heat is again supplied to the rotor assembly. This operation continues until the desired temperature is reached and "zero" output is present at bridge 100. The desired pre-selected rate of temperature increase to provide a temperature profile as indicated at "C" can be obtained by trial and error. Also, this rate can be initially approximated by obtaining a "no heat added" profile, such as curve A and marking off an increment equal to the maximum permissable temperature tolerance, e.g., 0.1°C, as indicated at 115. The corresponding slope on curve A, indicated at 167, can serve as a first approximation of the maximum desired rate. Further routine adjustment of the rate limiter circuit will optimize the heating cycle. In the event that with the initial "hold off" setting, the rate limiter circuit 160 never "turns on," i.e., the maximum desired slope is always exceeded, then lower "hold off" settings should be successively applied until the rate limiter circuit 160 becomes operative. The maximum rate setting can then be adjusted to minimize the time $T_4$ required to reach an acceptable temperature. For most tests using a centrifugal photometric analyzer, this time should be less than thirty to forty seconds.

With further reference to curve C of FIG. 3, illustrating a temperature curve where temperature control is provided in accordance with the present invention, continuous hot air is supplied in the interval $T_1$ to $T_1'$. Hot air is then turned off until the slope of curve C decreases at 490 to just below the maximum desired slope 500. Rate Limiter circuit 160 then causes hot air to be re-applied and the maximum desired rate of temperature increase is essentially maintained until the desired temperature is achieved at 510, at which time the control system is "off" since the voltage at the output of bridge 100 is "zero." The cuvette temperature will then "over shoot" only within the desired tolerance. In the event that curve C goes below the desired tolerance at 520 a signal will be developed at bridge 100 and trigger circuit 120 will cause heat to be re-applied and the temperature will be maintained within the desired tolerance.

FIG. 5 illustrates more specifically the system of FIG. 4. With reference to FIG. 5 the output of cuvette thermistor 36 is applied via slip rings 42 to bridge circuit 100 which, in addition to thermistor 36, comprises fixed resistors 300 and 302 and the conventional adjustable resistor arrangement which includes fixed resistors 306, 308 and 310 and adjustable resistors 312, 314 and 316. Switch 318 is positioned to select the temperature value at which the bridge output will be "zero," i.e., balanced, for the desired cuvette temperature. For example, if the desired cuvette temperature is to be 30°C, switch 318 is placed in that position and a temperature of 30°C established in the cuvette. Adjustable resistor 314 is then varied until the bridge output at 320, more practically, the amplifier output at 340, is "zero." The bridge circuit 100 is thus calibrated for a desired cuvette temperature of 30°C. The bridge can be similarly calibrated for other desired cuvette temperatures. The output of bridge circuit 100 is applied to amplifier 110, for example a commercial differential amplifier such as Fairchild $\mu$A 725. Customary +15 VDC and -15VDC supplies to amplifier 110 are provided at 322 and 324 respectively. A conventional feedback circuit 326, comprising resistor 328 and capacitor 330, is provided together with a conventional temperature balancing resistor 334. The output of amplifier 110 appears at resistor 338. By way of example, if the output of bridge circuit 100 is 0.02 volts for each degree Centigrade that the cuvette temperature is below the desired temperature (which can be determined by routine calibration) amplifier 110 will provide an increased signal, e.g., 1 volt per degree Centigrade, depending on the amplifier gain. Under these exemplary circumstances, if upon introduction of cold test liquid into the cuvette, the temperature drops from its initial value of 30° to 20°C, an output signal of 10 volts will be provided at location 340 at the output of amplifier 110. This signal is applied at the input 342 of trigger circuit 120 and the input 344 of "hold off" circuit 150. As shown in FIG. 5. "hold off" circuit 150 comprises amplifier 344, which can be a commercial differential amplifier such as Fairchild $\mu$ A741, which is provided with +15 volts and −15 volts at 346 and 348. A reference voltage input signal for "hold off" amplifier 344 is provided by way of adjustable resistor 350 and fixed resistor 352 supplied with +15VDC as indicated at 354. This reference signal from adjustable resistor 350 is the "hold off" signal. For example, if as previously noted, the desired cuvette temperature is 30°C, and the cuvette temperature falls to 20°C upon introduction of cold test liquid, the "hold off" voltage at adjustable resistor 350 can be set to 5 volts as a first approximation, if the output of amplifier 110 is 1 volt per degree centigrade, as previously given by way of example. Under these circumstances, as long as the output of bridge amplifier 110 is more than 5 volts, a signal is provided at the output of "hold off" amplifier 344 which, due to gate arrangement 165 (comprising diodes 353 and 355), prevents an inhibiting signal from passing from rate limiter circuit 160 to trigger circuit 120. Consequently, the signal from bridge amplifier 110 is applied to trigger circuit 120 at 342, and causes electrical pulses to be applied to power switch 130 whereupon AC power is passed through heater element 62 of air heater 140 and hot air is delivered to the enclosure surrounding the cuvette as previously described, whereby the cuvette temperature is increased. Trigger circuit 120 can be a commercial unit such as Fairchild $\mu$ A 742 and is arranged to receive an AC reference signal at 356 by way of transformer 359, and DC power at 358 through the arrangement comprising resistors 360 and 362, diode 364 and filter circuit 366.

With a positive signal applied to the trigger circuit 120 at 342, output pulses appear at 367 and are applied via transformer 370 and power switch 130 to heater element 62 until an inhibiting signal, e.g., 15 volts DC is applied at 368.

Such an inhibiting signal will be applied when the output of bridge amplifier 110 increases greater than the pre-set rate of voltage increase due to the heating of the cuvette by hot air supplied from air heater 140. At this time, gate 165 will "open,"* permitting the signal at the output 370 (if a signal is present) to be applied at the input 368 of trigger circuit 120 which "turns off" the trigger circuit 120 discontinuing the application of hot air to the cuvette. Whether an inhibiting signal is present at the output 370 of the rate limiter circuit 160 depends on the rate of increase of the output signal of bridge amplifier 110 (which is proportional to the rate of temperature rise in the cuvette) and the desired maximum rate of cuvette temperature increase, determined for example in the manner previously described in connection with FIG. 3. The rate of increase for the output signal of bridge amplifier 110 is detected by a conventional derivative circuit 372 comprising capacitor 374 and resistor 376. The derivative, or rate signal obtained is applied at 378 to amplifier 380, which can be a commercial differential amplifier such as Fairchild $\mu$A741. Amplifier 380 also receives a reference signal at 382 from temperature compensating resistor 382, which corresponds to the desired maximum rate and is set by adjustment of variable resistor 384. For example, if the maximum desired rate of temperature increase is 0.01°C/second, the pre-set voltage at 382 would, neglecting off-set in amplifier 380, be 0.88 millivolts for a typical value of 22K ohms for resistor 376 and 4 microfarads for capacitor 374. Any off-set in amplifier 380 can be taken care of by adjustment of variable resistor 384. For as long as the voltage at 378 is larger in magnitude (more negative) than this value (0.88 mv) i.e., the rate of temperature increase is above the desired maximum, the output of amplifier 380 is a positive signal, e.g., +15VDC, and an inhibiting signal is applied via gate 165 to trigger circuit 120 and heater unit 140 will be inactive. When, however, the voltage at 378 is lower than the pre-set value (0.88 mv) i.e., the rate of temperature increase is below the desired pre-set value, the output of amplifier 380 becomes negative and this signal is blocked by diode 355 whereupon trigger circuit 120, and hence heater unit 140, is activated to supply additional hot air to the cuvette and raise the temperature at a faster rate. This procedure then continues until the desired cuvette temperature is reached, e.g., 30°C, at which time the output of bridge amplifier 110 is "zero" and circuit operation ceases.

*(i.e., close the circuit)

If it is desired to further reduce the time required to reach the desired cuvette temperature, the pre-set rate voltage at 382 can be gradually increased while avoiding an undesirable temperature "over shoot."

In the event that, with the initial estimated pre-set "hold off" voltage, the inhibiting signal of the rate limiter amplifier 380 is never applied to trigger circuit 120, i.e., the rate limiter never "cuts in," the likelihood is that the "hold off" signal at 350, at the input to amplifier, is too small in magnitude and should be gradually increased in magnitude until the rate limiter 160 "cuts in" at least once before the desired temperature is reached.

By way of example, in the operation of a particular embodiment of the present invention the cuvette containing ring member (containing 30 cuvettes having a volume 0.45 to 0.6 milliliters each) was formed of an aluminum ring (cross section of approximately 1⅜×⅝ inches × + inches) having an inner diameter of 5½ inches and an outer diameter of 8¼ inches. The weight of the ring member was about 1 kilogram and the effective heat transfer area was 30–35 in². The outer surfaces of the aluminum ring member, and also the inner cuvette surfaces, were coated with a layer of Teflon about 3–9 mils thick. The aluminum ring member was located in an aluminum housing similar to the arrangement shown in FIG. 1. The outer diameter of the housing formed of ⅛ inch aluminum was approximately 10 inches and the height was about 6–7 inches. The housing was affixed to a base plate of ½ inch thick aluminum. The top of the housing was essentially closed by plastic members made of polystyrene. The ring member and sample-reagent disc were rotated at 1,000 RPM and the 30 cuvettes were each filled with about 0.4 milliliters of sample and reagent at a temperature of 15° to 20°C so that a total of about 12 grams of liquid was introduced into the cuvette containing ring member. Since the liquid was 95 percent or more $H_2O$, this is the thermal equivalent of about 12 grams of water. The aluminum cuvette containing ring member was initially at a temperature of 30°C, due to previous heating, which was the desired cuvette reaction temperature. Heated air was available, through a duct arrangement as indicated in FIG. 1, at about 65°C and 20 cubic feet per minute from a heater unit controlled by the system of the present invention. The desired reaction temperature of 30° C was reached within about 30 seconds and maintained within ± 0.1°C by the action of the control system of the present invention.

The temperature control system of the present invention has a high degree of flexibility. For example, with the system adjusted to provide a cuvette temperature control as indicated in curve C in FIG. 3, for the largest and coldest liquid sample to be handled by the centrifugal analyzer, smaller and less cold samples will be raised to the desired temperature (and maintained at this temperature) within the required time without any need for further adjustment of the system. Such smaller and less cold samples are indicated as curves D and E in FIG. 3. For curve D, heated air will be initially continuously supplied for only the relatively short interval d after which heat control is provided by operation of the rate limiter circuit 160 in the manner previously described. For curve E, initial continuous heating will not be provided and heat control will be provided only by operation of rate limiter circuit 160. Of course, if desired, optimization of time required to raise the D and E type samples to the desired temperature can be achieved following the procedure previously described.

I claim:

1. A temperature control apparatus comprising a metal base member; a plurality of chambers adapted to contain liquid located within said base member in heat transfer relationship therewith, the thermal mass of the base member being substantially larger than the thermal mass of the thermal mass of liquid contained in the chambers; housing means substantially enclosing the base member and chambers to separate the base member and chambers from ambient temperature; a heating element adapted to develop heat by the passage of electrical current therethrough, means for passing air in contact with the heating element for the heating of said air and for introducing the heated air into the housing member to transfer heat developed in the heating element to the base member and chambers to raise the temperature thereof to a desired value; temperature sensing means adapted to provide an electrical signal proportional to the amount by which a selected chamber is below the desired value; control means responsive to the signal of the temperature sensing means adapted to supply electrical energy to the heating element; rate detecting means for obtaining an electrical signal proportional to the rate of temperature increase of the selected chamber and for applying such electrical signal to the control means to inactivate the control means when the rate of temperature increase is above a predetermined value; means for preventing the signal from the rate detecting means from inactivating the control means as long as the temperature of the selected chamber is below a predetermined value.

2. An apparatus in accordance with claim 1 wherein said base member is formed of aluminum.

3. An apparatus in accordance with claim 1 wherein chambers are enclosed within the base member and the thermal mass of the base member is at least about 5 times the mass of liquid in the chambers.

4. An apparatus in accordance with claim 1 wherein the chambers are enclosed within said base member, the base member is formed of aluminum, and the thermal mass of the base member is about 20 times the thermal mass of the liquid in the chambers.

* * * * *